United States Patent
Wu et al.

(10) Patent No.: US 7,058,396 B2
(45) Date of Patent: Jun. 6, 2006

(54) CALLING METHOD USING SHORT MESSAGE TRANSMISSION ON CALENDAR GROUP

(75) Inventors: Vincent Wu, Taoyuan Hsien (TW); Sam Chang, Taoyuan Hsien (TW)

(73) Assignee: Lite-On Technology Corporation, Taipei (TW)

( * ) Notice: Subject to any disclaimer, the term of this patent is extended or adjusted under 35 U.S.C. 154(b) by 427 days.

(21) Appl. No.: 10/222,776

(22) Filed: Aug. 19, 2002

(65) Prior Publication Data
US 2004/0203946 A1    Oct. 14, 2004

(30) Foreign Application Priority Data
Jul. 5, 2002    (TW) ............................... 91115015 A

(51) Int. Cl.
*H04M 3/00*    (2006.01)
(52) U.S. Cl. .................. 455/418; 455/419; 455/412.1; 455/466
(58) Field of Classification Search .............. 455/466, 455/422.1, 412.2, 412.1, 566, 567, 418, 419; 340/7.51, 7.52, 7.55
See application file for complete search history.

(56) References Cited

U.S. PATENT DOCUMENTS

| | | | | |
|---|---|---|---|---|
| 6,119,014 A | * | 9/2000 | Alperovich et al. | ......... 455/466 |
| 6,125,281 A | * | 9/2000 | Wells et al. | ................ 455/466 |
| 2003/0092454 A1 | * | 5/2003 | Halim et al. | ................ 455/466 |

* cited by examiner

*Primary Examiner*—Temica Beamer
(74) *Attorney, Agent, or Firm*—Bacon & Thomas, PLLC

(57) ABSTRACT

A calling method using a short message transmission on a calendar group is utilized to send a coded calendar in a man machine interface of a mobile device from this mobile device to another mobile device through a short message transmission. A short message is decoded by using a same decoding method used for the transmitter mobile device to transfer into a corresponding calendar state in the receiver mobile device after it receives the short message in order to inform a meeting participant or a group member a meeting appointment, meeting time or other messages. And, a function such as an alarm time prompting can be set for a receiver side to mention the receiver through a same manner. Therefore, not only calendar-receiving mobility can be increased, but also expenses can be saved because informing meeting participants by telephone is unnecessary if the method according to the present invention is used.

6 Claims, 2 Drawing Sheets

CALLING METHOD USING SHORT MESSAGE TRANSMISSION ON CALENDAR GROUP

TECHNICAL FIELD

The present invention relates to a calling method using a short message transmission on a calendar group, and more particularly to a method transmitting a calendar through a short message coded and designed in a man machine interface of a mobile device.

BACKGROUND OF THE INVENTION

At present, a telephone user only sets a calendar function in a mobile device. To the view of a business management, nothing but e-mail is used for a unit manager to inform a meeting participant about a meeting or to announce important messages to a company member. But, the messages cannot be received if the participant or the member is absent from a computer. And, telephone fee must be spent to inform the participant or the member.

SUMMARY OF THE INVENTION

A calling method using a short message transmission on a calendar group according to the present invention is used to transmit application situations (such as setting of alarm, content of memo and calling mode) coded through the special design of man machine interface software of a mobile device by a short message transmission manner. The short message received by another corresponding mobile device is decoded through a same decoding mode used in the transmitter mobile device and transferred to the corresponding states of the receiver mobile device. Taking this structure as a basis, a calendar design in a man machine interface of a mobile device can transmit almost all messages including meeting reminding and meeting time information in a calendar through this manner to every person or group member. Meanwhile, functions such as a receiver's alarm time can also be set by this manner to remind the receiver.

Therefore, the main object of the present invention is to provide a calling method using a short message transmission on a calendar group; a calendar function is transmitted to a receiver through a short message mode so as to obtain a far-end calendar transmission.

Another object of the present invention is to provide a calling method using a short message transmission on a calendar group, every meeting member can receive a meeting notice or important message at any time and any place even if they are absent from their seat or leave the office. Thereby, a mobile effect can be reached.

Still another object o the present invention is to provide a calling method using a short message transmission on a calendar group, it is highly possible for meeting members to receive meeting notices so that extra telephone fee can be saved.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

Figure 1:
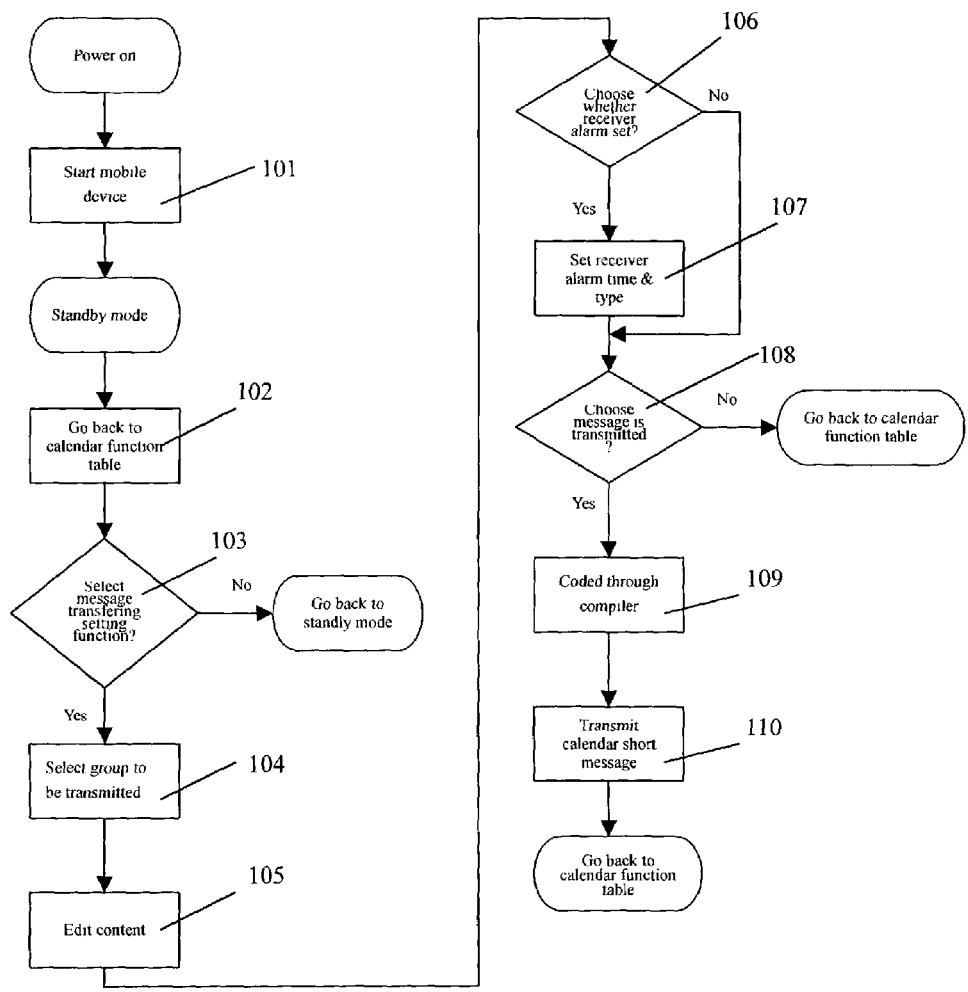
FIG. 1 is a flow chart showing steps for sending a calendar short message out according to the present invention.

First, please refer to FIG. 1, which shows steps for a mobile device to transmit a calendar message. In the beginning, a mobile device is powered on, start the mobile device (step 1) to let it stay in a standby mode. Switch the function table of the mobile device to a calendar function table (step 102). Thereafter, select calendar short message transmission establishment function (step 103). Go back to the standby mode, if the selection is given up. First, choose meeting groups that a meeting notice wants to be transmitted if the selection is taken (step 104). Edit the content of a calendar message to be transmitted (step 105). Select whether an alarm is set at the receiver's end (step 106). If it is, set alarming time and type (step 107), and then choose whether the message and setting are sent out (step 108). If it is not, go directly back to the calendar function table. If it is, the calendar is coded to be a short message through a compiler (step 109). And then, the user can transmit calendar short message (step 110) and go back to the calendar function table.

Figures 2, 3:
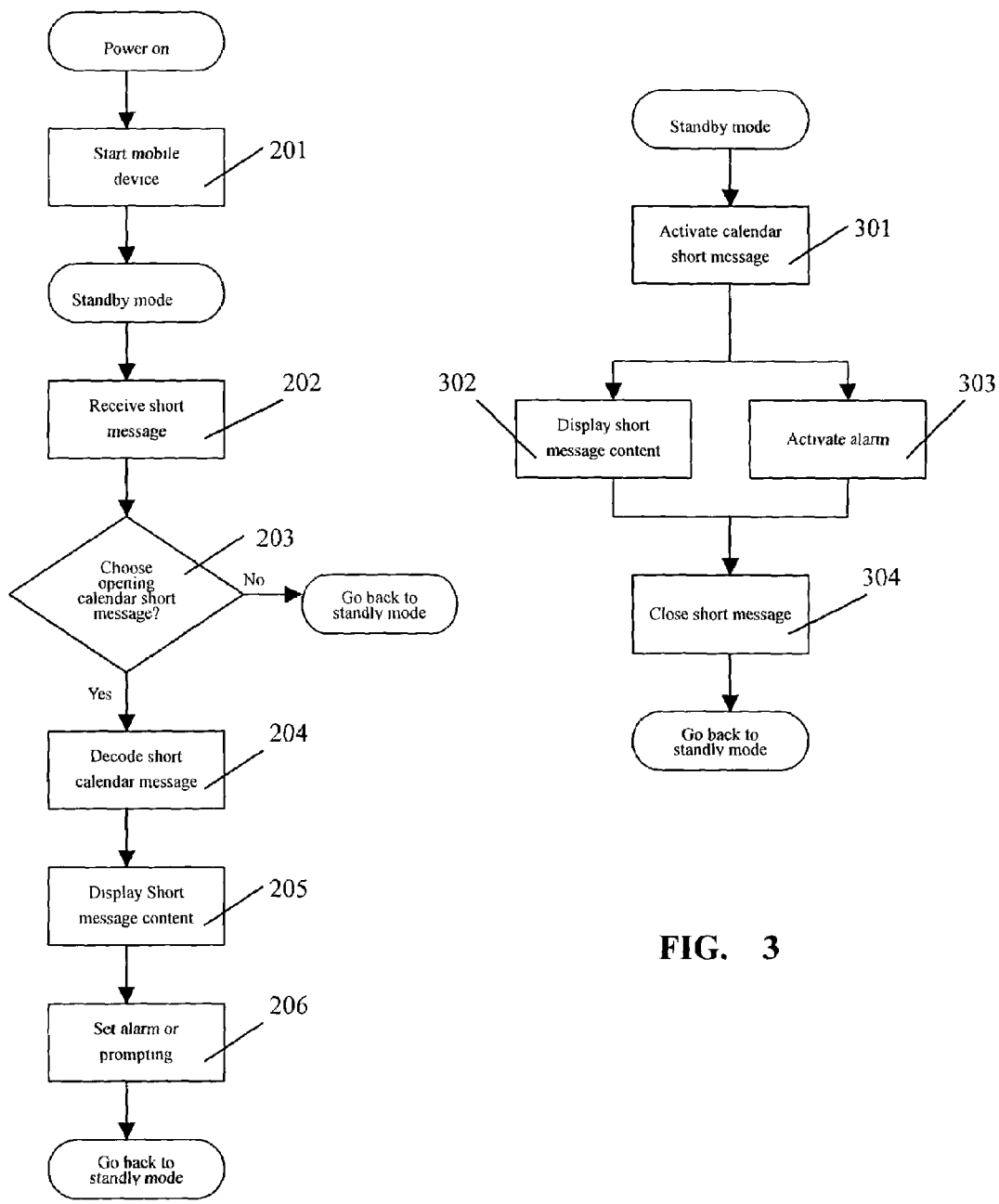
FIG. 2 is a flow chart showing a receiver's movement when the receiver receives a calendar short message.
FIG. 3 is a flow chart showing steps for activating a calendar short message after a receiver receives the message.

Next, please refer to FIG. 2, which shows steps of movements for receiving a calendar short message by a receiver. In the beginning, a calendar short message receiver's mobile device is powered on first, start the mobile device (step 201), and then, enter a standby mode. Meanwhile, the mobile device processes the movement for receiving the calendar short message (step 202). Thereafter, the receiver chooses whether to open the calendar message (step 203). If not, go directly back to the standby mode. If the message is opened, the mobile device decodes the calendar short message (step 204), and then displays the content of the calendar short message (step 205). The receiver can set a calendar alarm or short message prompting at this time (step 206), and then go back to the standby mode.

Finally, please refer to FIG. 3, which is a flow chart used to illustrate movement for starting a calendar short message. Although the steps for starting a calendar short message are well known to the person skilled in the art, they are indispensable to the method according to the present invention so that it si necessary to be described here. In the beginning, a mobile device stays in a standby mode. Activate a calendar short message (step 301). Next, display the content of the calendar (step 302) or activate an alarm (step 303). Thereafter, the receiver closes the calendar message (step 304) and the mobile device goes back to the standby mode.

The following description is an example of the method according to the present invention. A meeting host uses a calendar short message function to select meeting participants (short message receiver) and edits the time and content of the meeting. Meanwhile, set alarm time for a receiver's mobile device, and then compile and transmit these messages. The receiver opens and decodes this short message after he receives it, the monitor of the mobile device will display the time and the content of the meeting, and the receiver sets the alarm time of the mobile device. When the set time is up, the alarm is activated and the monitor displays the message to remind the receiver the meeting time. Go back to the calendar function table after the receiver cancels the alarm.

What is claimed is:

1. A method for transmitting an application state of a mobile device by a short message type, mainly comprising:
   (a) switching to a calendar function of a message originator's mobile device;
   (b) setting in the message originator's mobile device a calendar short message transmission establishment function;
   (c) setting in the message originator's mobile device a meeting group to be transmitted;
   (d) compiling an application state of calendar software to be transmitted by the message originator's mobile device through a coding mode designed in man machine interface software of the message originator's mobile device;
   (e) transmitting said coded application state to a mobile device of a receiver through a short message transmission manner; and
   (f) decoding the content of said short message through a decoding mode same as said coding mode and transferring said decoded short message to a corresponding state in the receiver's mobile device after said receiver's mobile device receives said short message, thereby causing said corresponding state in the receiver's mobile device to be the same as the application state of the calendar software in the message originator's mobile device.

2. The method of claim 1, wherein said application state comprises an alarm setting, memo content and calling mode.

3. A method for transmitting a calendar short message, mainly comprising:
   (1) entering a short message transmission setting of a calendar function table in a mobile device;
   (2) selecting or editing a content of a message;
   (3) selecting a receiver including a person or group;
   (4) choosing and setting an alarm time and type in said mobile device of said person and said group
   (5) compiling said selected or edited message through a calendar short message coding mode in said mobile device; and
   (6) transmitting said message to a receiver's mobile device by a short message transmission.

4. A method for receiving a calendar short message, mainly comprising the following steps:
   (1) a calendar short message receiving person or group's mobile device is in standby mode;
   (2) said mobile device receiving codes of said calendar short message;
   (3) opening said calendar short message;
   (4) decoding said calendar short message;
   (5) displaying a content of said short message; and
   (6) said mobile device further enabling setting of a calendar alarm or message prompt in response to decoding of said calendar short message.

5. A calling method using a short message transmission on a calendar group, mainly taking three procedures: a calendar short message transmission, a calendar short message receiving and a calendar short message activation; wherein said calendar short message transmission comprises the following steps:
   (1) enter a calendar short message transmission setting of a calendar function table in a mobile device;
   (2) choose calendar short message receivers;
   (3) edit a content of said calendar short message;
   (4) choose and set an alarm time and type for a calendar short message of a receiver's mobile device;
   (5) process compiling on said content of said calendar short message through a calendar short message coding method;
   (6) transmit said content through a short message; and
   (7) go back to said calendar function table after said transmission;
   wherein said calendar short message receiving comprises:
   (8) enter a standby mode of said receiver's mobile device;
   (9) receive said calendar short message in said receiver's mobile device;
   (10) open said calendar short message;
   (11) decode said calendar short message;
   (12) display said content of said short message; and
   (13) set a calendar alarm or short message prompting;
   wherein said calendar short message activation comprises:
   (14) enter a standby mode of said receiver's mobile device;
   (15) activate calendar short message;
   (16) display said content of said calendar short message and activate said alarm to remind said receiver;
   (17) close said calendar short message and stop said alarm; and
   (18) go back to said standby mode.

6. The method of claim 5, wherein said receiver is a person or group.

* * * * *